(12) United States Patent
Fujii

(10) Patent No.: US 10,694,084 B2
(45) Date of Patent: Jun. 23, 2020

(54) IMAGING APPARATUS CAPABLE OF EFFICIENTLY RADIATING HEAT OF AN IMAGE SENSOR WITHOUT AN INCREASE IN SIZE

(71) Applicant: CANON KABUSHIKI KAISHA, Tokyo (JP)

(72) Inventor: Kazuki Fujii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/032,962

(22) Filed: Jul. 11, 2018

(65) Prior Publication Data
US 2019/0020800 A1     Jan. 17, 2019

(30) Foreign Application Priority Data

Jul. 14, 2017  (JP) .................................. 2017-137726

(51) Int. Cl.
*H04N 5/225*     (2006.01)
*G03B 17/55*    (2006.01)

(52) U.S. Cl.
CPC ....... *H04N 5/22521* (2018.08); *H04N 5/2252* (2013.01); *H04N 5/2254* (2013.01)

(58) Field of Classification Search
CPC ............. H04N 5/22521; H04N 5/2253; H04N 5/2254; H04N 5/2252; G03B 17/55
See application file for complete search history.

(56) References Cited

U.S. PATENT DOCUMENTS

| | | | | |
|---|---|---|---|---|
| 2009/0014827 | A1* | 1/2009 | Lim | H01L 27/14618 257/434 |
| 2011/0298925 | A1* | 12/2011 | Inoue | H04N 5/2252 348/148 |
| 2013/0070102 | A1* | 3/2013 | Gustafson | H04N 5/33 348/164 |
| 2013/0107115 | A1* | 5/2013 | Tobinaga | H04N 5/2253 348/374 |
| 2014/0104479 | A1* | 4/2014 | Samuels | G03B 17/55 348/335 |
| 2018/0039162 | A1* | 2/2018 | Ali | G03B 17/55 |
| 2018/0316831 | A1* | 11/2018 | Nishino | G02B 7/02 |
| 2018/0356710 | A1* | 12/2018 | Bingleman | G03B 17/26 |
| 2019/0041600 | A1* | 2/2019 | Sakamoto | H05K 9/0081 |

FOREIGN PATENT DOCUMENTS

| | | |
|---|---|---|
| CN | 101539711 A | 9/2009 |
| CN | 102346357 A | 2/2012 |
| CN | 103048854 A | 4/2013 |
| CN | 104793447 A | 7/2015 |
| JP | 2005-252547 A | 9/2005 |

* cited by examiner

*Primary Examiner* — Albert H Cutler
(74) *Attorney, Agent, or Firm* — Canon U.S.A. Inc., IP Division

(57) ABSTRACT

An imaging apparatus includes a lens barrel unit, an image sensor substrate having an image sensor, a metal plate to which an image sensor substrate is fixed, a lens barrel holder made of a metal material and configured to support the lens barrel unit, a third cover member made of a heat-conductive resin material fixed to the lens barrel holder and configured to cover the circumferential surface of the lens barrel unit, and a heat-conductive member configured to conduct heat of an image sensor sheet metal to the lens barrel holder. At least a part of the lens barrel holder is disposed inside the third cover member.

6 Claims, 6 Drawing Sheets

IMAGING APPARATUS CAPABLE OF EFFICIENTLY RADIATING HEAT OF AN IMAGE SENSOR WITHOUT AN INCREASE IN SIZE

BACKGROUND OF THE INVENTION

Field of the Invention

The present disclosure relates to an imaging apparatus capable of efficiently radiating heat of an image sensor.

Description of the Related Art

Monitoring cameras are generally provided with a heat radiation mechanism since the temperature of an image sensor and electronic components for driving the image sensor rises during operation.

For example, an imaging apparatus discussed in Japanese Patent Application Laid-Open No. 2005-252547 is provided with a heat-conductive member having a first portion disposed to sandwich an electronic component between itself and a substrate, and a second portion disposed to sandwich the substrate between itself and an image sensor. The heat-conductive member is configured to radiate heat of the image sensor and the electronic component from an exterior cover through the heat-conductive member.

However, a technique discussed in Japanese Patent Application Laid-Open No. 2005-252547 may possibly have a disadvantage in a monitoring camera that disposing a heat-conductive member to sandwich an electronic component between itself and a substrate increases the size of the monitoring camera in the optical axis direction.

SUMMARY OF THE INVENTION

The present disclosure is directed to offering an imaging apparatus capable of efficiently radiating heat of an image sensor without increasing the size of the apparatus.

According to an aspect of the present disclosure, an imaging apparatus includes a lens unit, a substrate having an image sensor, a metal plate to which the substrate is fixed, a holder member made of a metal material and configured to support the lens unit, a first cover member made of a heat-conductive resin material fixed to the holder member and configured to cover a circumferential surface of the lens unit, and a heat-conductive member for conducting heat of the metal plate to the holder member. At least a part of the holder member is disposed inside the first cover member.

Further features of the present disclosure will become apparent from the following description of exemplary embodiments with reference to the attached drawings.

DESCRIPTION OF THE EMBODIMENTS

Figure 1:
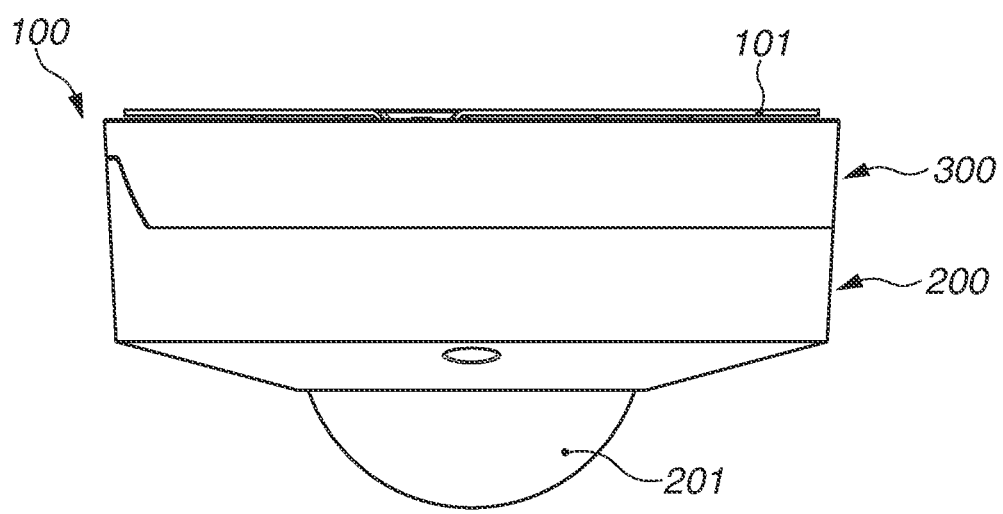
FIG. 1 illustrates an outer appearance of an imaging apparatus according to a first exemplary embodiment.
Figure 2:
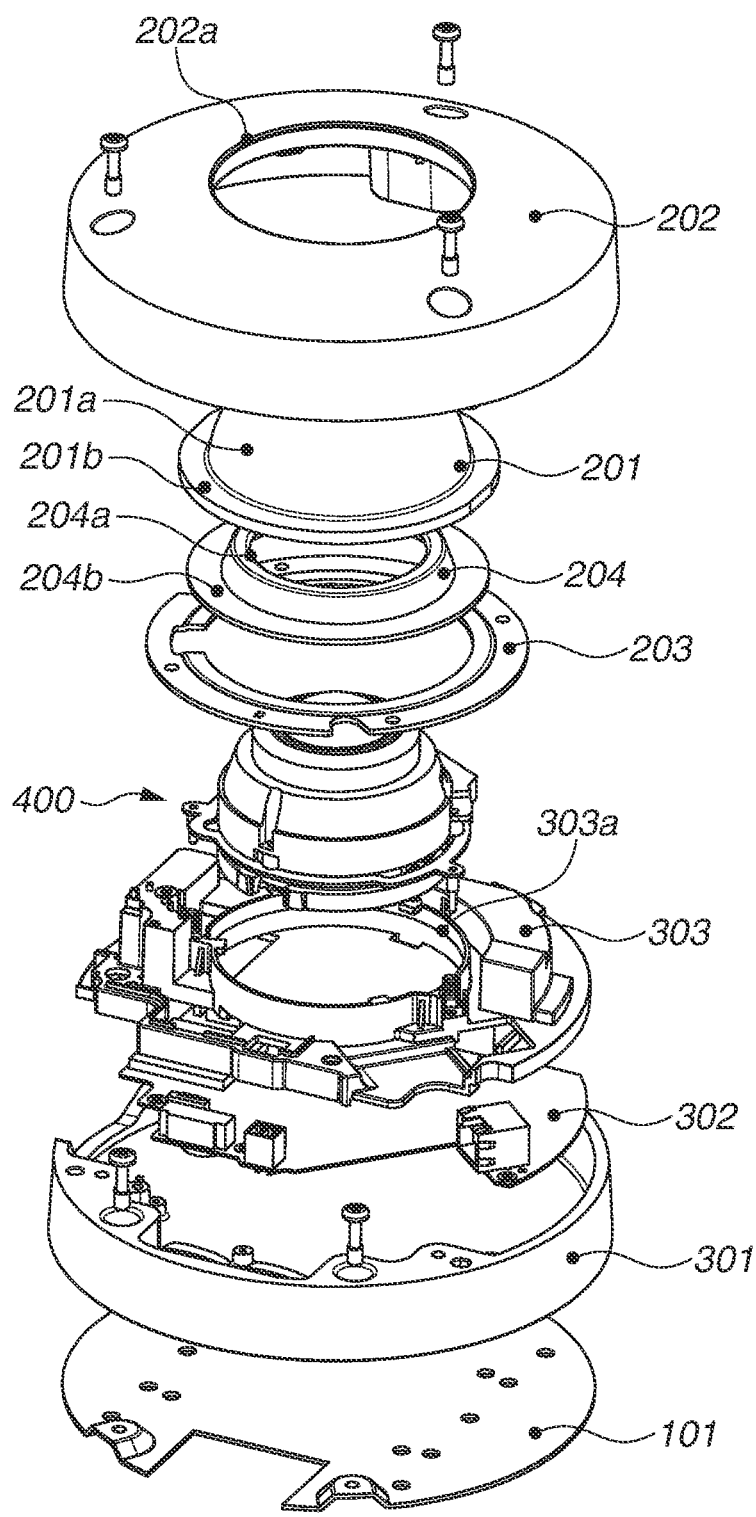
FIG. 2 is an exploded perspective view illustrating the imaging apparatus according to the first exemplary embodiment.
Figure 3:
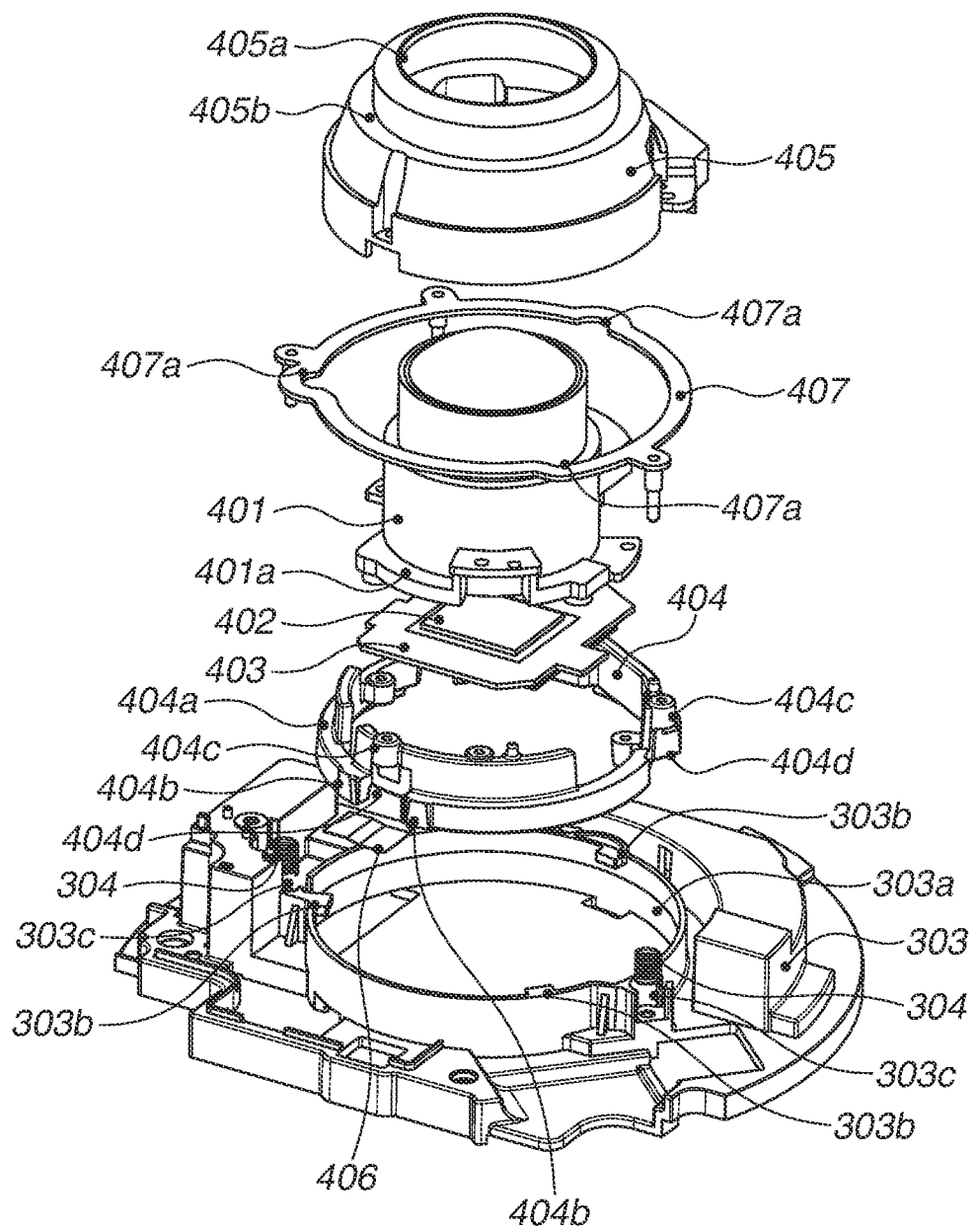
FIG. 3 is an exploded perspective view illustrating a lens barrel unit according to the first exemplary embodiment.

An exemplary embodiment will be described below with reference to the accompanying drawings. FIG. 1 illustrates an outer appearance of an imaging apparatus according to a first exemplary embodiment. FIG. 2 is an exploded perspective view illustrating the imaging apparatus according to the first exemplary embodiment. FIG. 3 is an exploded perspective view illustrating a lens barrel unit according to the first exemplary embodiment.

An imaging apparatus 100 includes an upper-case unit 200, a lower-case unit 300, and a lens barrel unit 400 and is fixed to a ceiling or a wall surface via a fixing sheet-metal part 101.

The upper-case unit 200 is composed of a transparent or translucent, approximately hemispherical dome member 201, an upper case 202, a ring-shaped sheet metal 203, and a first cover member 204.

One side of the upper case 202 is opened wide, and the other side thereof is provided with a circular opening 202a smaller than the circumferential cylinder.

The dome member 201 is composed of a hemispherical dome portion 201a and a flange portion 201b larger than the circular opening 202a of the upper case 202. The dome portion 201a is inserted into the circular opening 202a of the upper case 202 to be partially protruded. The upper surface of the flange portion 201b abuts the inner surface of the upper case 202.

The first cover member 204 is composed of an approximately cylindrical member 204a having a circular opening, and a flange portion 204b larger than the circular opening 202a of the upper case 202.

The sheet metal 203 is fixed to the upper case 202 with screws to hold the flange portion 201b of the dome member 201 and the flange portion 204b of the first cover member 204.

The lower-case unit 300 is composed of a lower case 301, a main substrate 302 having an image signal circuit unit, various control signal circuit units, and a power source circuit unit, a second cover member 303 formed to cover the main substrate 302, and lens barrel urging springs 304 in FIG. 3.

One side of the lower case 301 is opened wide, and the other side is provided with boss shapes for attaching various parts on the inner side.

The main substrate 302 is provided with a local area network (LAN) cable connector and a user interface portion such as a switch for restarting the imaging apparatus 100 and is fixed to the boss portions of the lower case 301.

As illustrated in FIG. 3, the second cover member 303 has a cylindrical rib 303a at the central portion, a plurality of ribs 303b inwardly protruding from the rib 303a, and a plurality of small grooves 303c formed on the outer side of the rib 303a. The second cover member 303 is fixed to the lower case 301 to cover the main substrate 302. A lens barrel urging spring 304 is disposed in each small groove 303c.

As illustrated in FIG. 3, the lens barrel unit 400 is composed of a lens barrel member 401, an image sensor substrate 402, an image sensor sheet metal 403, a lens barrel holder 404, a third cover member 405 as an example of a cover member, a heat-conductive member 406, and an urging auxiliary sheet metal 407.

The lens barrel member 401 as an example of a lens unit has a cylindrical shape and holds various lenses in the cylinder. The lens barrel member 401 has a fixing flange portion 401a.

The image sensor substrate 402 as an example of a substrate has an image sensor and is electrically connected with the main substrate 302 via an electrical connecting unit such as a flexible printed circuit (FPC, not illustrated).

The image sensor sheet metal 403 as an example of a metal plate has an opening at the central portion in which the image sensor can be inserted. With the image sensor inserted, the image sensor substrate 402 is adhesively fixed to the image sensor sheet metal 403 at the peripheral portion of the image sensor. The image sensor sheet metal 403 is fixed to the lens barrel member 401.

Figure 4:
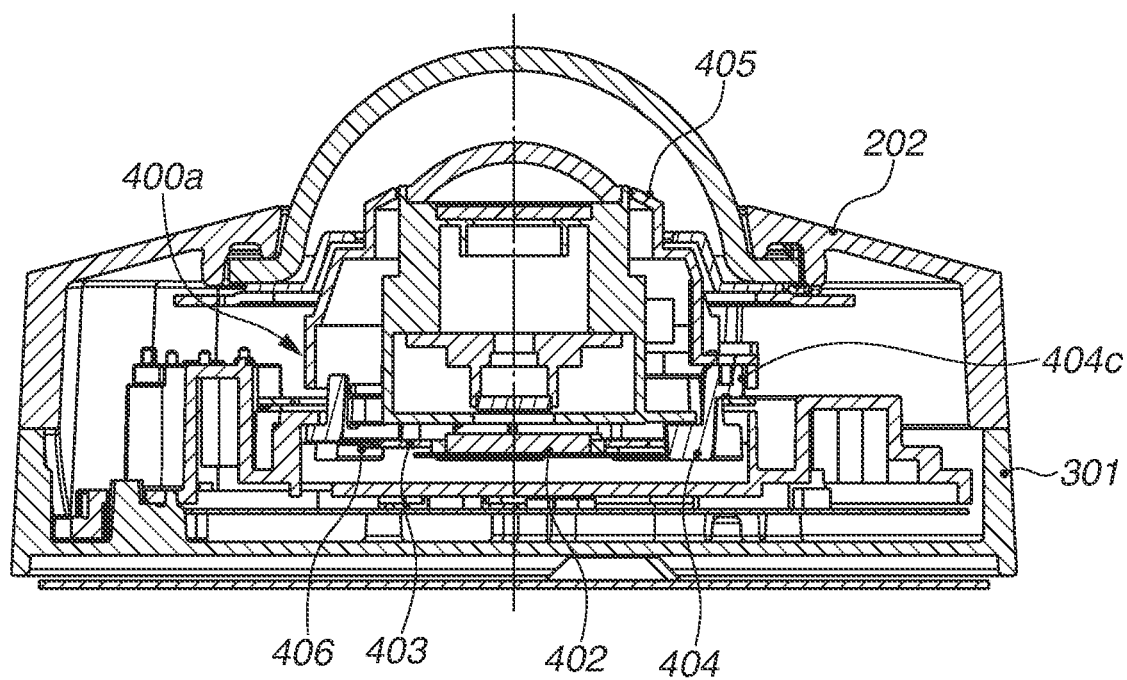
FIG. 4 is a sectional view illustrating the imaging apparatus according to the first exemplary embodiment.

The lens barrel holder 404 as an example of a holder member supports the lens barrel member 401. The lens barrel holder 404 made of a metal material has an approximately cylindrical shape. The lens barrel holder 404 is provided with a stepped portion 404a on the outer side of the cylinder, an outer diameter portion 404b, a plurality of radially protruding boss portions 404c, and a plurality of notches 404d in the outer diameter portion 404b. As illustrated in FIG. 4, a part of the lens barrel holder 404 is disposed at an internal portion 400a of the third cover member 405.

The third cover member 405 as an example of a cover member is made of, for example, a highly heat-conductive resin material containing a heat-conductive filler. The third cover member 405 may be made of a material having a thermal conductivity of 3 W/m·K or higher. The third cover member 405 is disposed to cover the circumferential surface of the lens barrel member 401. The third cover member 405 is provided with a circular opening 405a and a stepped portion 405b. The third cover member 405 is fixed to the boss portions 404c of the lens barrel holder 404 in a state where the lens barrel member 401 is disposed in such a manner that a front lens of the lens barrel member 401 is inserted into the circular opening 405a. As illustrated in FIG. 4, the third cover member 405 is disposed to contact the lens barrel holder 404.

The heat-conductive member 406 is a flexible sheet made of a highly heat-conductive material such as copper, aluminum, and graphite. The heat-conductive member 406 conducts heat of the image sensor sheet metal 403 to the third lens barrel holder 404. The heat-conductive member 406 having adhesive layers at both ends is stuck on the image sensor sheet metal 403 and the lens barrel holder 404.

The urging auxiliary sheet metal 407 is a ring-shaped sheet metal made of a metal material such as stainless steel. The urging auxiliary sheet metal 407 has relief portions 407a at positions facing the boss portions 404c of the lens barrel holder 404.

The attachment of the lens barrel unit 400 to the lower-case unit 300 will be described below.

The lens barrel unit 400 is assembled to the lower-case unit 300 to be rotatable around the optical axis of the lens barrel member 401. In a state where the positions of the notches 404d of the lens barrel holder 404 of the lens barrel unit 400 are aligned with the positions of the ribs 303b of the second cover member 303 of the lower-case unit 300, the outer diameter portion 404b of the lens barrel holder 404 and the cylinder rib 303a are fitted and assembled. In this case, the pins of the urging auxiliary sheet metal 407 of the lens barrel unit 400 are inserted into the urging springs 304 disposed on the lower-case unit 300. Then, the urging springs 304 urge the urging auxiliary sheet metal 407 in the optical axis direction to make it contact the boss portions 404c of the lens barrel holder 404, thus urging the lens barrel unit 400 in the optical axis direction. After the lens barrel unit 400 is assembled to the second cover member 303, the lens barrel unit 400 is rotated around the optical axis and then attached thereto. Then, the ribs 303b of the second cover member 303 contact the stepped portion 404a of the lens barrel holder 404, regulating the movement of the lens barrel unit 400 in the optical axis direction.

With the end faces of the upper case 202 and the lower case 301 in contact with each other, the upper-case unit 200 and the lower-case unit 300 are fixed to each other.

The thus-configured imaging apparatus 100 forms a subject image in the image sensor through the dome member 201 and the lens barrel unit 400. The main substrate 302 processes an acquired signal and provides a user with desired data via an external connection unit such as a LAN cable. In installation and maintenance works, the upper-case unit 200 is removed and various user interface portions of the main substrate 302 of the lower-case unit 300 are accessed. When adjusting an output image after the imaging apparatus 100 is installed on a ceiling or wall surface, the upper-case unit 200 is removed and the lens barrel unit 400 is rotated around the optical axis.

A radiation path of the image sensor mounted on the image sensor substrate 402 will be described below with reference to FIG. 4. FIG. 4 is a sectional view illustrating the imaging apparatus 100 according to the first exemplary embodiment.

Heat generated by the image sensor is transmitted to the image sensor sheet metal 403 via the adhesive layer between the image sensor substrate 402 and the image sensor sheet metal 403. Then, the heat is transmitted from the image sensor sheet metal 403 to the lens barrel holder 404 via the heat-conductive member 406. Then, the heat transmitted to the lens barrel holder 404 is transmitted from the contact portion facing the third cover member 405 to the third cover member 405 through heat conduction.

As illustrated in FIG. 4, a part of the lens barrel holder 404 is disposed at the internal portion 400a of the third cover member 405. Therefore, heat is transmitted from the lens barrel holder 404 to the third cover member 405 by thermal radiation at that portion.

With such a configuration, the lens barrel holder 404 that is generally used and third cover member 405 can be used as a heat sink of the image sensor. Therefore, heat of the image sensor can be efficiently radiated without increasing the size of the imaging apparatus 100.

Figure 5:
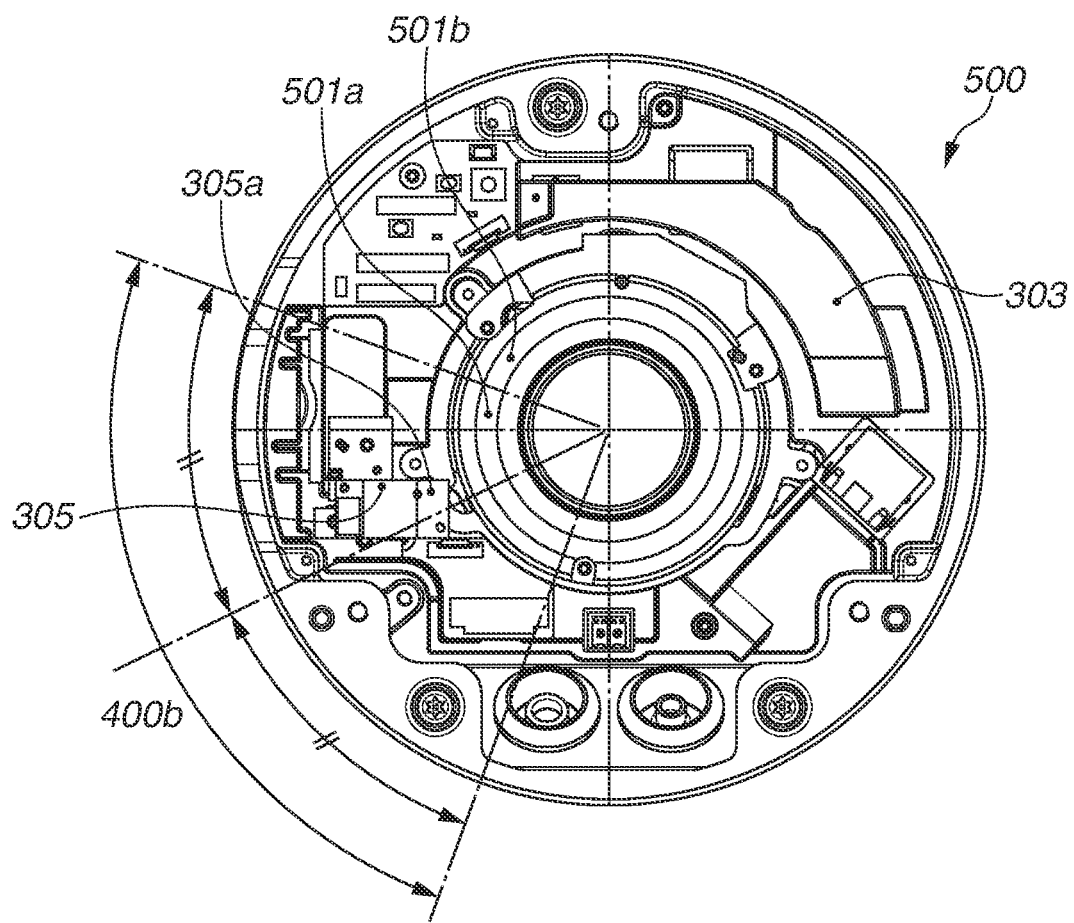
FIG. 5 illustrates an internal configuration of an imaging apparatus according to a second exemplary embodiment.

A second exemplary embodiment will be described below with reference to FIG. 5. FIG. 5 illustrates an internal configuration of an imaging apparatus 500 according to the second exemplary embodiment. Descriptions of elements identical to those in the first exemplary embodiment will be omitted.

The lower-case unit 300 further includes a wireless module 305 and a sheet-metal part 306 for fixing the wireless module 305 (not illustrated). The wireless module 305 includes an antenna unit 305a and a processing circuit unit and is connected to the main substrate 302 through an electrical connecting unit such as an FPC (not illustrated). For electric wave transmission and reception, the wireless module 305 is fixed to the second cover member 303 via the sheet-metal part 306 in such a manner that the antenna unit 305a is oriented to the center of the imaging apparatus 500.

A third cover member 501 is provided with a first portion 501b made of a highly heat-conductive resin member containing a heat-conductive filler, and a second portion 501a made of a general resin member (having a thermal conductivity of 1 W/m·K or less). For example, the first portion 501*b* and the second portion 501*a* are assembled with snap fitting or screwing (not illustrated). The second portion 501*a* of the third cover member 501 is in such a size that the wireless module 305 is disposed at a position facing the second portion 501*a* of the third cover member 501 when viewed from the optical axis direction even when the lens barrel unit 400 rotates. More specifically, the third cover member 501 is configured in such a manner that the second portion 501*a* occupies at least a rotational angular range 400*b* of the lens barrel unit 400 when viewed from the optical axis direction.

Such a configuration makes it possible to maintain a stable communication state without disturbing transmission and reception of electric waves of the wireless module 305 even in a case where the first portion 501*b* made of a highly heat-conductive resin member is conductive.

Figure 6:
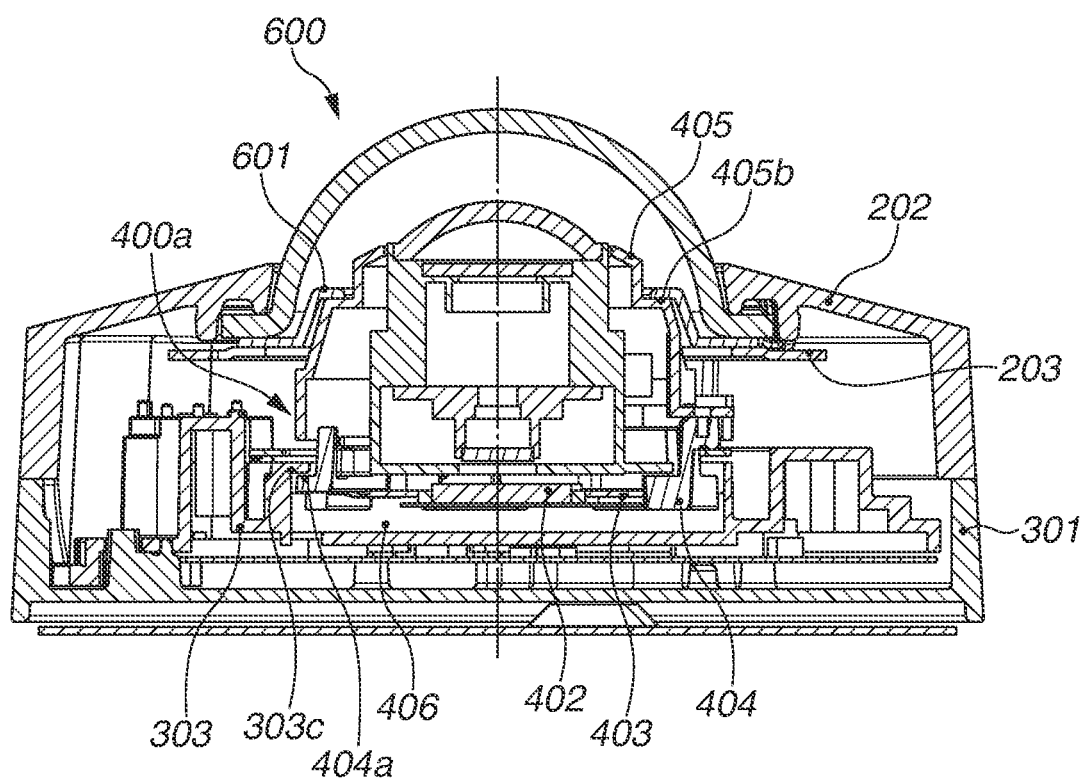
FIG. 6 is a sectional view illustrating an imaging apparatus according to a third exemplary embodiment.

A third exemplary embodiment will be described below with reference to FIG. 6. FIG. 6 is a sectional view illustrating an imaging apparatus 600 according to the third exemplary embodiment. Descriptions of elements identical to those in the first exemplary embodiment will be omitted.

A first cover member 601 as a second cover member is made of, for example, a highly heat-conductive resin member containing a heat-conductive filler.

With the end faces of the upper case 202 and the lower case 301 as examples of exterior covers in contact with each other, the upper-case unit 200 and the lower-case unit 300 are fixed. In this case, the inner surface of the first cover member 601 of the upper-case unit 200 contacts the stepped portion 405*b* of the third cover member 405 of the lens barrel unit 400. A fixed amount of gap is formed between each of the ribs 303*b* of the second cover member 303 and the stepped portion 404*a* of the lens barrel holder 404.

The radiation path of the image sensor will be described below with reference to FIG. 6. Heat generated by the image sensor is transmitted to the image sensor sheet metal 403 via the adhesive layer between the image sensor substrate 402 and the image sensor sheet metal 403. Then, the heat is transmitted to the lens barrel holder 404 via the heat-conductive member 406. Then, the heat spreading in the lens barrel holder 404 is transmitted from the contact portion between the lens barrel holder 404 and the third cover member 405 to the third cover member 405 through heat conduction. As illustrated in FIG. 6, in this configuration, a part of the cylinder of the lens barrel holder 404 is inserted into the internal portion 400*a* of the third cover member 405, enabling more efficient heat conduction by the effect of thermal radiation at the portion. The heat transmitted to the third cover member 405 is transmitted to the first cover member 601 by heat conduction via the contact portion between the stepped portion 405*b* and the first cover member 601. Then, the heat transmitted to the first cover member 601 is transmitted from the ring-shaped sheet-metal part 203 to the upper case 202 as a heat radiation exit of the imaging apparatus 600.

Forming such a radiation path enables more efficient radiation of heat generated by an image sensor.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-137726, filed Jul. 14, 2017, which is hereby incorporated by reference herein in its entirety.

What is claimed is:

1. An imaging apparatus comprising:
a lens unit which has a cylindrical shape;
a cover member configured to cover an outer peripheral surface of the lens unit and having an outer peripheral surface;
a wireless module;
a support member configured to support the wireless module and the cover member;
wherein the cover member has a first portion and a second portion, the first portion and the second portion are arranged side by side in a circumferential direction, and the second portion has a thermal conductivity lower than a thermal conductivity of the first portion, and
wherein the wireless module is disposed at a position facing the outer peripheral surface of the second portion in a radius direction of the cover member.

2. The imaging apparatus according to claim 1, further comprising a holding member made of a metal material and configured to support the lens unit, wherein the holder member and at least a part of the cover member are disposed to contact each other.

3. The imaging apparatus according to claim 2, further comprising a heat-conductive member for conducting heat of a metal plate to the holder member, wherein the heat-conductive member is a flexible sheet made of copper, aluminum, or graphite.

4. The imaging apparatus according to claim 1, wherein the cover member is made of a resin material containing a heat-conductive filler.

5. The imaging apparatus according to claim 1, further comprising:
a second cover member which contacts the cover member; and
a case as an exterior cover,
wherein heat transmitted to the cover member is transmitted to the case via the second cover member.

6. An imaging apparatus comprising:
a lens unit having a substrate for an image sensor and a metal plate to which the substrate is fixed;
a holder member made of a metal material and configured to support the lens unit;
a heat-conductive member for conducting heat of the metal plate to the holder member;
a first cover member made of a heat-conductive resin material, configured to cover a surface of the lens unit and contact the holder member;
a second cover member which contacts the first cover member; and
a case as an exterior cover,
wherein heat transmitted to the first cover member is transmitted to the case via the second cover member.

* * * * *